July 11, 1967    SHINJI NAKAZAWA ET AL    3,330,902
CONSERVATOR FOR OIL-FILLED TRANSFORMER
Filed June 15, 1965
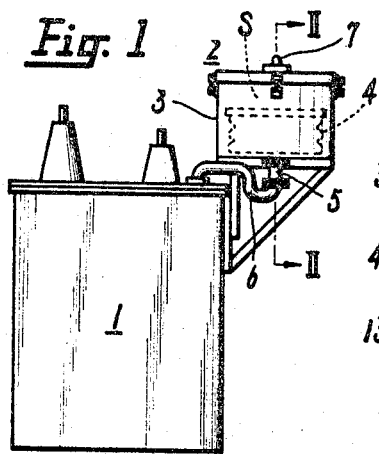
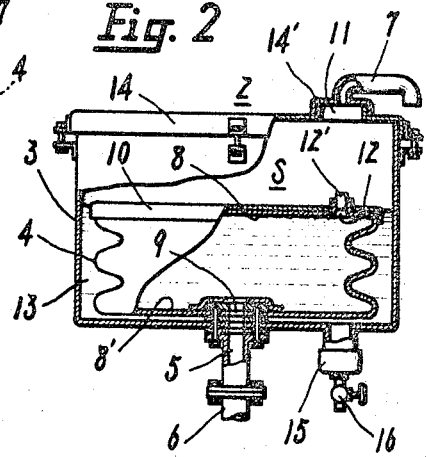
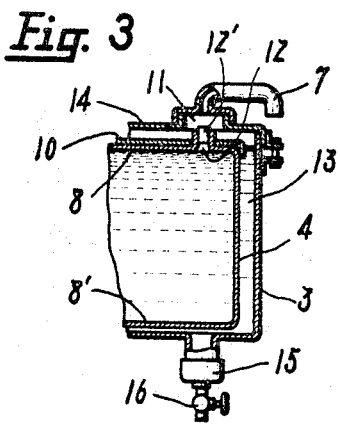
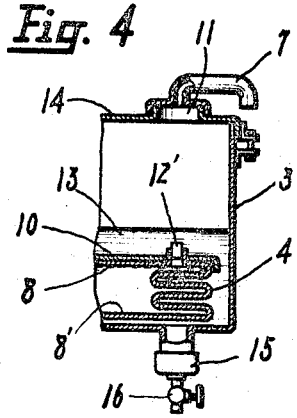
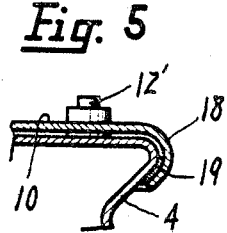
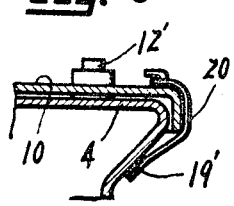
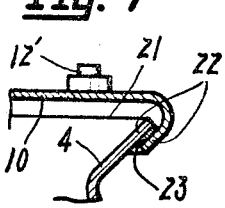
INVENTOR
Shinji Nakazawa and Tohru Nakazawa
BY McGlew and Toren
ATTORNEYS

3,330,902
CONSERVATOR FOR OIL-FILLED TRANSFORMER
Shinji Nakazawa and Tohru Nakazawa, both of 1057 Hiratsuka 7-chome, Shinagawa-ku, Tokyo, Japan
Filed June 15, 1965, Ser. No. 464,016
Claims priority, application Japan, July 14, 1964, 39/55,400
6 Claims. (Cl. 174—12)

The present invention relates to a conservator for oil-filled transformer to regulate volumetric change due to expansion or contraction of the transformer oil.

We have already proposed a conservator for oil-filled transformer in which an expansible resilient cell made of synthetic rubber or synthetic resin with its opening directed downwardly, is fixed on the bottom of a conservator metal casing, so that said cell is communicated with said oil-filled transformer through said opening and is filled with oil of said transformer; said cell is immersed in a pressure balancing oil contained in said casing; air space remained above the pressure balancing oil in said casing is communicated with ambient air through a vent-pipe, so as to regulate volumetric change of oil in said transformer due to variations of transformer-loading and ambient temperature.

In said conservator having oil-filled expansible cell immersed in pressure balancing oil, upper surface of said expansible cell has a tendency to take the same level with said pressure balancing oil and to expose partially or wholly its upper surface to said air space within said casing, thereby air and air-borne moisture in said casing having been permeated into the transformer oil through upper wall of said cell and oil filled therein, results in reduction of dielectric strength of the transformer oil due to its deterioration. Further, by the fact that air space remained in the conservator casing above the pressure balancing oil breathes ambient air according to expansion and contraction of said cell, moisture condensed and deposited on the inner surface of said casing from the breathed air tends to aggregate and being dropped on the upper surface of said cell, is also permeated into the transformer oil and deteriorates the oil. Furthermore, comparatively larger quantity of said balancing oil should be required to make the cell able to expand and contract in said balancing oil, therefore, inevitably increase the volume of the conservator casing.

According to the present invention an improved conservator for oil-filled transformer is provided, said conservator comprising a conservator casing, an expansible cell in said casing, said cell communicating with transformer, being filled with transformer oil, and is immersed in pressure balancing oil contained in said casing, to balance the pressure of inner and outer sides of the cell at any point, and remaining upper air space therein, as in the already-proposed conservator; characterised by that a top-plate made from synthetic resin or metal, impermeable to oil, water and air, and having substantially same dimension as the top surface of said cell, is superimposed to said cell to cover it, or the upper wall of said cell is formed by said top-plate; peripheral edge of said plate is affixed and sealed with said cell, thereby the top-plate is held just on the same level or slightly below the level of the pressure balancing oil and prevent direct contact of the cell to air above said pressure balancing oil.

An object of the present invention is to provide an improved conservator of this kind in which disadvantages of the already-proposed conservator are effectively eliminated, by holding any point of the surface of the cell below the level of the pressure balancing oil by means of said top-plate.

Another object of the present invention is to provide an improved conservator of this kind in which a quantity of the pressure balancing oil and volume of the conservator could be reduced without impairing desired operation of the conservator.

The accompanying drawings will illustrate four embodiments of the present invention, wherein;

FIG. 1 is a side-elevation of an oil-filled transformer having a conservator according to the present invention.

FIG. 2 is a detailed sectional view of the conservator, taken along the line II—II of FIG. 1, showing the expansible cell in its normal operating position.

FIG. 3 is a partial sectional view of the conservator, showing the expansible cell in its most expanded position.

FIG. 4 is a partial sectional view similar to FIG. 3, showing the expansible cell in its fully folded-in position.

FIGS. 5, 6 and 7 are, respectively, a partial sectional view of the expansible cell and the top-plate, showing respective another embodiment of the present invention.

Referring now to FIG. 1 of the drawings, the oil-filled transformer, designated by 1, is provided with a conservator 2 of the present invention mounted thereon. In the casing 3 of said conservator, an expansible or foldable cell 4 is fixed and immersed in the pressure balancing oil as hereinafter will be described. Said cell 4 is fixedly connected to the bottom of said casing 3 and is communicated with said transformer 1 through an oil pipe 5 and a connecting pipe 6. A vent-pipe 7 is fixed on the casing 3 of the conservator 2, through which air space S remained above said pressure balancing oil in said casing is vented to ambient air.

A conservator of the present invention will now be explained more in detail by referring to FIG. 2.

The expansible or foldable cell made from resilient synthetic rubber or synthetic resin, having top and bottom flat walls 8 and 8′, and having an opening 9 in its bottom wall 8′, is connected to an oil pipe 5 fixedly attached to said bottom wall 8′ by means of a suitable attachment, as illustrated. Said oil pipe 5 is connected to a connecting pipe 6 leading to inside of the transformer 1, thereby the cell 4 is communicated with the transformer as already described. On the flat top wall 8 of the expansible cell 4, a top-plate 10, which is made from thin metal plate or synthetic resin, impermeable to air, oil and water, is superimposed to cover the upper surface as well as the upper peripheral edge of the cell 4. An exhausting opening 12 closable e.g. by a plug 12′ is provided on the wall 8 of said cell 4, and by exhausting air within the cell 4 through said opening 12, causing a part of insulation oil filled in the transformer 1 to rise in said cell, so as to make the cell being always filled with a part of transformer oil.

The conservator casing 3 having contained therein so-called pressure balancing oil 13 in which said expansible cell 4 is immersed. By said pressure balancing oil, the inner and outer pressure at any point of the cell is equalized, so that no stress is applied to the material of the cell. For said balancing oil, there may be used the same insulation oil as that filled in the transformer 1 or the expansible cell 4.

According to the present invention, said expansible cell 4, during its normal operation, need not be deeply immersed in the pressure balancing oil 13. The cell 4 will operate satisfactorily provided the top-plate 10 is slightly immersed in the pressure balancing oil 13, or its upper surface is approximately in the same level as that of said oil 13 when transformer oil is in normal temperature. When the temperature of the transformer oil is low, said expansible cell 4 being folded and immersed in the pressure balancing oil 13, as shown in FIG. 4, however, when the inner pressure of the cell becomes higher than the outer pressure according to the temperature rise of the transformer oil, the cell 4 is expanded upwards as well as sidewards, resulting in raising the level of the balancing oil 13, so that the upper face of the top-plate 10 and the level of the oil 13 being raised substantially by same rate, as shown in FIG. 3, and therefore, the expansive cell 4 never comes into direct contact with the air in the space S, without containing a larger quantity of pressure balancing oil 13 in the conservator casing.

In FIG. 2, a vent-pipe 7 is shown as being connected to a cover 14' of man-hole or hand-hole 11, said pipe 7, however, may be connected to any position on the cover 14 of said casing.

As shown in FIG. 2, a well 15 having a drain cock 16 is provided in the bottom of the casing 3 for the purpose of draining off water collected in said well 15. When water having been condensed from air and deposited on the inner surface of the casing 3 above the level of the balancing oil 13, is dropped or fallen down onto the top-plate 10 or said oil 13, or when airborne moisture having been entered into the space S through the vent-pipe 7, permeates the oil 13, they will be collected in said well 15 and may be drained off through the cock 16.

Upon contraction of the cell 4 from its expanded position shown in FIG. 3, oil level of the oil 13 will be lowered in response to said contraction in the same rate as the top-plate 10. In either operating position, the cell 4 is prevented from being exposed to air space S. Oil pressures exerted to the cell on its outside and inside are balanced, as the cell is flexible, thereby a smooth operation of the conservator will be obtained.

In an embodiment of the present invention shown in FIG. 5, peripheral edge 18 of the top-plate 10 is turned downwardly along the upper periphery of the cell 4 and is sealed thereto by means of suitable binder 19 composed of synthetic rubber, for example, and therefore, said sealed peripheral edge 18 will be always held below the upper surface of the top-plate which is maintained substantially in flush with the level of the pressure balancing oil 13, even in the case of the upper surface of said top-plate would be exposed to air in the space 14.

As shown in FIG. 6, top-plate 10 can be stationary affixed on the cell 4 at several spaced points along their peripheries, by means of connecting tapes or cords 20 which are connected their upper ends to the top-plate 10, and bound their lower ends to the cell 4 by means of suitable binder 19', respectively.

In another embodiment shown in FIG. 7, cell 4 is opened at its top end 21, top-plate 10 forming upper wall of the cell 4 is affixed and sealed to said cell 4 along their overlapped peripheries 22, by means of binder 23. In this embodiment, said sealed peripheries 22 are also positioned below the upper surface of said top-plate.

What we claim is:

1. A conservator for oil immersed transformers comprising a housing, a gas-tight expansible cell located within said housing and having a flat top wall and a lower portion secured to the bottom of said housing, conduit means for connecting the interior of said cell to a transformer for receiving and delivering transformer insulating oil, pressure balancing oil in said housing in a quantity to immerse said cell in said balancing oil and to leave an air space in said housing above the level of said balancing oil, means connecting the air space above said balancing oil in said housing to the atmosphere, a top plate superimposed on said cell flat top wall and covering said wall and having a downwardly peripheral edge covering an upper peripheral edge of said cell and being affixed along said downwardly turned edge to said cell, said housing and said cell being of a size such that the upper surface of said top plate moves approximately in the same level with the said balancing oil during operation of the transformer.

2. A conservator, according to claim 1, wherein said top plate is made of a synthetic material impermeable to oil, water and air, said flat top plate being connected to said cell by binding material.

3. A conservator, according to claim 1, wherein said top plate is made of a metal material.

4. A conservator, according to claim 1, wherein said top plate is affixed to said cell along its downwardly turned edge by an adhesive binder extending all around the periphery thereof and forming a seal at the connection.

5. A conservator, according to claim 1, wherein said top plate is affixed to said cell at several spaced locations around its periphery by means of connecting tapes, said tapes being adhesively secured to said cell.

6. A conservator, according to claim 1, wherein said cell is opened at its top but is covered by said top plate, said top plate being sealed to said cell along a down turned portion which overlaps the periphery thereof.

References Cited

UNITED STATES PATENTS

| | | | |
|---|---|---|---|
| 1,622,030 | 3/1927 | Edwards | 336—58 |
| 2,588,436 | 3/1952 | Violette | 174—12 X |
| 2,682,893 | 7/1954 | Ziebold | 138—30 |
| 3,123,784 | 3/1964 | Ritz | 336—94 X |
| 3,162,213 | 12/1964 | Peters | 138—30 |
| 3,253,081 | 5/1966 | Nakazawa et al. | 174—14 |

LEWIS H. MYERS, *Primary Examiner.*

T. J. KOZMA, *Assistant Examiner.*